Patented Oct. 14, 1941

2,259,063

UNITED STATES PATENT OFFICE 2,259,063

COMPLEX DIARYL GUANIDINE METAL SALT ADDITION COMPOUNDS AND PREPARATION THEREOF

Arnold R. Davis, Old Greenwich, Conn., assignor to American Cyanamid Company, New York, N. Y., a corporation of Maine No Drawing. Application August 3, 1940, Serial No. 351,156

6 Claims. (Cl. 260—429)

This invention relates to complex addition compounds of a diaryl guanidine and certain metal salts and to a process for their production. More particularly it is concerned with complex addition compounds of a diaryl guanidine and the chlorides and sulfates of zinc, aluminum, cadmium and tin.

I have found that these complex addition compounds may be prepared by heating to fusion a mixture of a solid diaryl guanidine and a solid acidic salt of the group consisting of the chlorides and sulfates of zinc, aluminum, cadmium and tin. By the fusion there are obtained complex addition compounds which are either essentially glassy and amorphous or essentially crystalline.

The salts of the present invention in their powdered form are useful as delayed action activators for the diaryl guanidine activatable accelerators, e. g. mercaptobenzothiazol and benzothiazyl disulfide, in the vulcanization of rubber. In my copending application, Serial No. 223,206, filed August 5, 1938 I have claimed the process of vulcanizing rubber with the aid of the amorphous complex addition compounds of a diaryl guanidine and zinc chloride.

The following examples will serve to illustrate the invention, to which however it is not to be restricted and in which the parts are by weight.

Example 1

28.76 parts (1 mole) of zinc sulfate as $ZnSO_4.7H_2O$ and 47.83 parts (2 moles) of di-o-tolyl guanidine were ground and then heated to 175° C. over a period of 60 minutes, water being given off from the mixture. A glassy product was obtained.

Example 2

26.66 parts (1 mol) of aluminum sulfate as $Al_2(SO_4)_3.18H_2O$ and 50.71 parts (3 mols) of diphenyl guanidine were ground together and then heated to a maximum temperature of 150° C. during a total heating period of 55 minutes, the mixture being held between 140° and 150° C. for 20 minutes. Water was given off during the fusion and a somewhat cloudy and glassy grey-colored product was formed which had a softening point of 110° C.

Example 3

24.14 parts (1 mol) of aluminum chloride, $AlCl_3.6H_2O$ and 71.75 parts (3 mols) of di-o-tolyl guanidine were ground together and then heated to a maximum of 180° C. during a total heating period of 1 hour and 45 minutes. The mixture was held between 150° and 160° C. for 20 minutes, then heated to 180° C. for 10 minutes and cooled to 155° C. in 23 minutes and poured onto tin foil to cool.

Water was given off during the heating and the product was a pinkish-colored and somewhat glassy material with a softening point of 149°–154° C. The product on standing became essentially crystalline.

Example 4

22.84 parts (1 mol) of cadmium chloride as $CdCl_2.2.5H_2O$ and 47.83 parts (2 mols) of di-o-tolyl guanidine were ground together and then heated to a maximum temperature of 160° C. during a total heating period of 2 hours and 40 minutes. The mixture was held between 150–160° C. for 15 minutes, then put in the oven at 100° C. for 25 minutes and further heated at about 150° C. for 1 hour.

Water was given off during the early part of the heating and the product, which was a clear reddish-colored glassy material, had a softening point of 75–77° C.

Example 5

22.56 parts (1 mol) of stannous chloride, $SnCl_2.2H_2O$ and 47.83 parts (2 mols) of di-o-tolyl guanidine were ground together and then heated to a maximum of about 160° C. during a total heating time of 1 hour and 10 minutes. The mixture was held for 10 minutes at 150–160° C. and the product was a brown, glass-like material which appeared somewhat soluble in water and had a softening point of 170–175° C. No water appeared to be given off during the heating. The product on standing became essentially crystalline.

Example 6

17.53 parts (1 mol) of stannic chloride as $SnCl_4.5H_2O$ and 47.83 parts (4 mols) of di-o-tolyl guanidine were ground and then heated to a maximum temperature of 160° C. during a total heating period of 1 hour. The mixture was held for 35 minutes at 150–160° C. The product was a light-colored glassy resin which appeared to be somewhat soluble in water and had a softening point of 156° C. The product on standing became essentially crystalline.

Example 7

27.2 parts of zinc chloride were powdered with 23.9 parts of di-o-tolyl guanidine to get the zinc chloride as fine as possible and the balance of the di-o-tolyl guanidine, 71.7 parts, were mixed with the powdered material. This mixture was then heated by means of an oil bath, the starting temperature of the oil bath being 110° C. After 45 minutes the mass was liquid with a temperature of 118° C. The temperature of the mass was allowed to drop to about 80° C. in 30 minutes and then the mass was heated to 100° C. in 1 hour and 10 minutes and held at 110° C. for 2 hours. This gave a glassy amorphous product.

Any diaryl guanidine may be fused with any of the metal salts recited in the examples and also with cadmium sulfate, stannous sulfate and stannic sulfate in the manner described in the examples to obtain non-hygroscopic complex addition compounds, reacting equivalents of the diaryl guanidine and the metal salts being employed.

It is to be noted that the heating times given in the examples are only by way of illustration and that the heating time required to obtain the fusion products will vary in accordance with both the character and the amounts of the diaryl guanidine and the metal chloride or sulfate to be fused. Where the complex addition product is inherently glassy or amorphous and it is found to contain some of the unreacted crystalline metal chloride or sulfate, the heating may be continued to insure the complete reaction and removal of the crystalline metal salt or in the case of an already cooled product this may be reheated to fusion for an additional time sufficient to react and thus eliminate the crystalline metal salt.

Suitable changes may be made in carrying out my invention without departing from the spirit and scope thereof.

What I claim is:

1. The complex addition compounds of a diaryl guanidine and a salt of the group consisting of the chlorides and sulfates of zinc, aluminum, cadmium and tin.

2. The complex addition compounds of a diaryl guanidine and zinc chloride.

3. The amorphous addition compound, di-o-tolyl guanidine and zinc chloride.

4. A process of preparing complex addition compounds of a diaryl guanidine and an acidic metal salt which comprises heating to fusion a diaryl guanidine and a salt of the group consisting of the chlorides and sulfates of zinc, aluminum, cadmium and tin.

5. A process of preparing amorphous complex addition compounds of a diaryl guanidine and zinc chloride which comprises heating to fusion a diaryl guanidine and zinc chloride.

6. A process of preparing the amorphous complex addition compound of di-o-tolyl guanidine and zinc chloride which comprises heating these materials to fusion.

ARNOLD R. DAVIS.

CERTIFICATE OF CORRECTION.

Patent No. 2,259,063.

October 14, 1941.

ARNOLD R. DAVIS.

It is hereby certified that error appears in the printed specification of the above numbered patent requiring correction as follows: Page 2, second column, line 15, claim 3, for "guanidine and zinc chloride." read --guanidine.zinc chloride.--; and that the said Letters Patent should be read with this correction therein that the same may conform to the record of the case in the Patent Office.

Signed and sealed this 25th day of November, A. D. 1941.

(Seal)

Henry Van Arsdale,
Acting Commissioner of Patents.